(12) United States Patent
Smith et al.

(10) Patent No.: US 7,269,829 B2
(45) Date of Patent: Sep. 11, 2007

(54) METHOD AND SYSTEM FOR REMOTE UPDATE OF MICROPROCESSOR CODE FOR IRRIGATION CONTROLLERS

(75) Inventors: Brian J. Smith, Aliso Viejo, CA (US); Eric Schafer, Carlsbad, CA (US)

(73) Assignee: Signature Control Systems, Inc., Irvine, CA (US)

( * ) Notice: Subject to any disclaimer, the term of this patent is extended or adjusted under 35 U.S.C. 154(b) by 228 days.

(21) Appl. No.: 10/902,034

(22) Filed: Jul. 30, 2004

(65) Prior Publication Data

US 2006/0025875 A1 Feb. 2, 2006

(51) Int. Cl.
| | |
|---|---|
| G05D 11/00 | (2006.01) |
| G05D 7/00 | (2006.01) |
| G06F 9/44 | (2006.01) |
| G06F 3/00 | (2006.01) |
| G06F 15/167 | (2006.01) |

(52) U.S. Cl. .................. 717/168; 700/284; 710/10; 709/220; 709/221; 709/222

(58) Field of Classification Search ............. 710/10; 711/100; 713/1–2, 100; 700/284; 717/168; 709/220–222

See application file for complete search history.

(56) References Cited

U.S. PATENT DOCUMENTS

| | | | |
|---|---|---|---|
| 5,579,522 A * | 11/1996 | Christeson et al. ............. 713/2 |
| 5,606,660 A * | 2/1997 | Estakhri et al. ................ 714/38 |
| 5,623,604 A * | 4/1997 | Russell et al. ............... 717/167 |
| 5,740,031 A * | 4/1998 | Gagnon ........................ 700/16 |
| 5,826,015 A * | 10/1998 | Schmidt ........................ 726/23 |
| 5,878,256 A * | 3/1999 | Bealkowski et al. ............ 713/2 |
| 6,031,867 A | 2/2000 | Johnson et al. |
| 6,055,632 A * | 4/2000 | Deegan et al. .............. 713/100 |
| 6,151,657 A | 11/2000 | Sun et al. |
| 6,205,526 B1 * | 3/2001 | Tanuma ...................... 711/162 |
| 6,237,091 B1 * | 5/2001 | Firooz et al. .................. 713/1 |
| 6,282,643 B1 * | 8/2001 | Cromer et al. ................. 713/2 |
| 6,314,340 B1 | 11/2001 | Mecham et al. |
| 6,341,143 B1 | 1/2002 | Nelson et al. |
| 6,493,788 B1 | 12/2002 | Sun et al. |
| 6,507,881 B1 * | 1/2003 | Chen .......................... 710/305 |
| 6,526,092 B1 | 2/2003 | Nelson et al. |

(Continued)

Primary Examiner—Ronald D Hartman, Jr.
(74) Attorney, Agent, or Firm—Posz Law Group, PLC

(57) ABSTRACT

A remote download of microprocessor code for an irrigation controller is provided. A microprocessor, on an irrigation controller, is executing program code (in volatile memory) and receives a remote download of updated program code, which it stores into non-volatile random access memory, e.g., flash memory. The microprocessor is configured to receive the updated program code, via a communication port, and to store the updated program code into the non-volatile flash memory. Optionally, the updated program code is received at multiple controllers via a global transmission on a communication bus. The microprocessor receives a communication causing it to re-start. In response to the re-start communication, the microprocessor fetches the updated program code stored in the non-volatile flash memory into the program memory RAM to replace the original program code, and begins execution of the updated program code in the program memory RAM. A device is also provided for directing the download of program code to irrigation controllers. Options provide for global download of entirely new program code, global and/or individual download of particular pages of updated program code, and global downloads to controllers grouped by communication speed.

19 Claims, 12 Drawing Sheets

U.S. PATENT DOCUMENTS

| | | | |
|---|---|---|---|
| 6,560,703 B1 * | 5/2003 | Goodman | 713/2 |
| 6,600,971 B1 * | 7/2003 | Smith et al. | 700/284 |
| 6,640,334 B1 * | 10/2003 | Rasmussen | 717/171 |
| 6,668,374 B1 * | 12/2003 | Sten et al. | 717/173 |
| 6,904,457 B2 * | 6/2005 | Goodman | 709/221 |
| 6,944,555 B2 * | 9/2005 | Blackett et al. | 702/62 |
| 6,990,577 B2 * | 1/2006 | Autry | 713/100 |
| 2002/0073304 A1 * | 6/2002 | Marsh et al. | 713/1 |
| 2003/0086107 A1 | 5/2003 | Johnson et al. | |
| 2003/0120860 A1 | 6/2003 | Sun et al. | |
| 2003/0120970 A1 | 6/2003 | Chen | |
| 2004/0015952 A1 * | 1/2004 | Lajoie et al. | 717/171 |
| 2005/0160217 A1 * | 7/2005 | Gonzalez et al. | 711/6 |

* cited by examiner

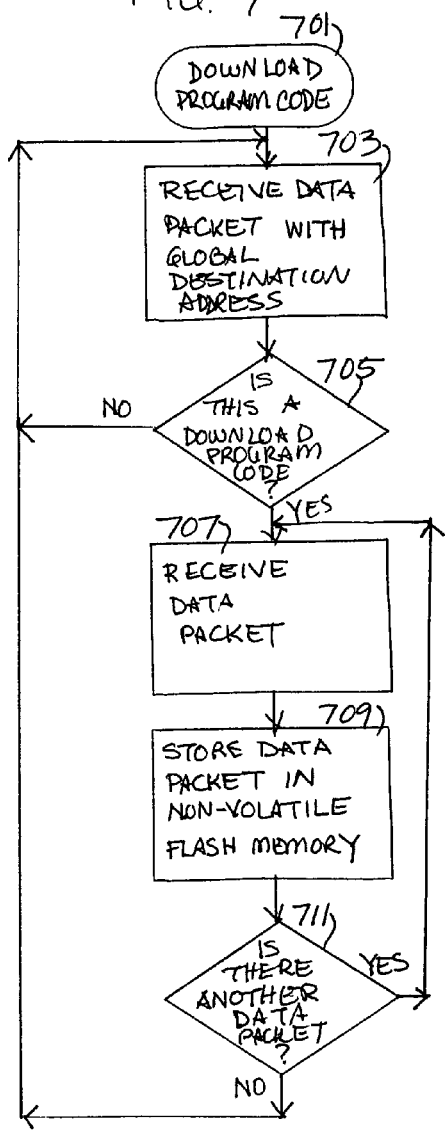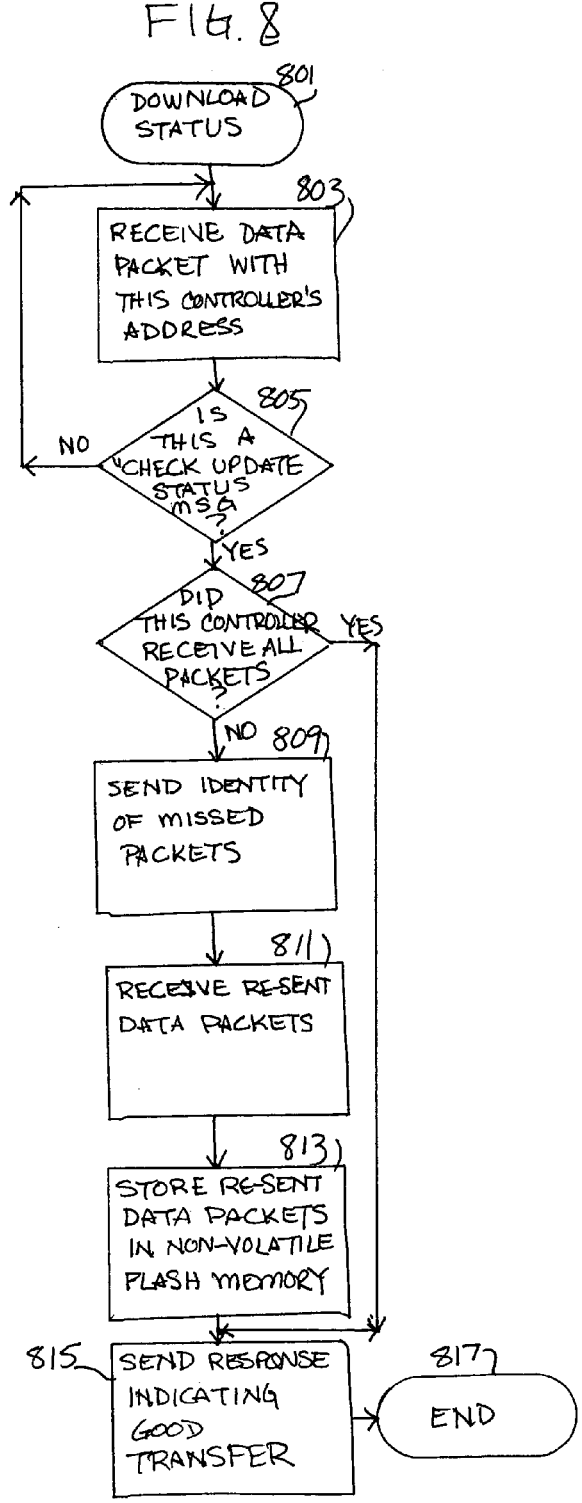

METHOD AND SYSTEM FOR REMOTE UPDATE OF MICROPROCESSOR CODE FOR IRRIGATION CONTROLLERS

BACKGROUND OF THE INVENTION

1. Field of the Invention

The present invention relates to systems for irrigation management and control. More particularly, the present invention relates to remotely updating microprocessor code in irrigation controllers, optionally where the controllers are networked.

2. Description of the Related Art

Today's irrigation management and control system may incorporate programmable functions into irrigation controllers. For example, stand-alone controllers that control multiple irrigation valves are used for smaller irrigation sites. The stand-alone controller offers a user interface, so that a user can set up automatic watering programs, perform manual watering, as well as perform some additional functions for irrigation control, and perhaps program various of these features.

A single controller is insufficient in larger installations because the distance between the controller and valve stations is too great. Multiple stand-alone systems can be used, but are awkward to control. An alternative is a central satellite control system, consisting generally of various sense and/or control devices (controllers) linked together in a satellite configuration via a communication bus and managed by a personal computer.

The satellite controller is similar to a stand-alone controller, which offers both valve control and various sensor interfaces. More sophisticated satellite controllers also have a user interface for local programming.

A controller may include a microprocessor, a general function of which generally is to accumulate information from input sources, and in turn use this data to control outputs. For example, a keypad and display may be used to input a desired watering schedule. The microprocessor will receive this data and transfer it to memory. The microprocessor may use a timer or other clock source to keep track of time, and when the start time of the user programmed watering schedule is recognized, the microprocessor will retrieve it from memory. It will then assert the state(s) of the valve output drivers as required.

Some aspects of conventional systems are illustrated by way of example in FIG. 1, shown in U.S. Pat. No. 6,314,340, Mecham et al. (expressly incorporated herein by reference). Mecham illustrates one example of a conventional irrigation controller 110. The controller 110 includes microprocessor (CPU) 112, a programmable read only memory (ROM/PROM) 114 and a random access memory (RAM) 116. The ROM/PROM 114 provides a non-volatile storage location for the programming code of the controller along with certain important (permanent) data necessary for execution of the code. The RAM 116 provides a volatile storage location for certain variable or temporary data generated during execution of the programming code. The microprocessor 112 communicates via an address bus 118 and a data bus 120. Data entry is via a user interface 126 or using a serial data download. A display 128 supports visual data presentation. A serial communications port 130 is provided between the controller 110 and external devices. Through this serial port 130, the programming code (and data) stored in the ROM/PROM 114 may be updated and data may be extracted from or downloaded to the RAM 116. A time of day clock 132 is provided. The microprocessor 112 outputs irrigation control signals to control the actuation of irrigation control valves 140 that control sprinklers 142. Input is provided via I/O bus 124 from temperature sensor 122, and other sensors 146, e.g., a moisture sensor 146 (1) or a rainfall gauge 146 (2).

Normally, operating code on a microprocessor is re-programmed by removing the microprocessor chip, reprogramming the chip, and re-installing the chip. While the above-mentioned solutions and others provide for individually customizable controllers, they fail to address the problem of quickly providing changes to microprocessor code itself in numerous controllers in the field. In the field, the result has been the need to individually remove and install, for example, microprocessor chips with upgraded firmware one-by-one. Needless to say, this is time-consuming and error prone.

The problem is exacerbated further where the controllers are distant from one another, such as at a large golf course installation. In addition, because of the difficulty of the problem, small error corrections in the microprocessor code tend to be put off and allowed to accumulate.

In an ideal world, however, corrections would be promptly installed. Therefore, there is a need for an ability to change out or update the operating system while it is still operating, in the field.

The result is a need for a solution in the field to the problem of repetitious and error-prone firmware installations. The above prior art references and other conventional systems, however, fail to meet the needs of easily updating firmware in several controllers. Moreover, none of these conventional systems provide for confirming that the desired firmware has been installed system-wide, for example. Users are still looking for a solution to remotely update microprocessor code, in connection with controllers.

SUMMARY OF THE INVENTION

The present invention alleviates the deficiencies of conventional techniques and systems described above in the various alternate embodiments described herein. The present invention responds to the need for a simple means to remotely update microprocessor code in microcontrollers.

One or more aspects of the present invention provide for a system and method for a simple upgrade. The added value provided to the controller itself leads to the following examples:

Program code bug fixes can be repaired quickly.

As new interfaces are developed, e.g. a new sensor type, a code update could provide compatibility to the new interface.

Custom requirements for a particular application can be developed in the code for a particular site.

Moreover, the invention is useful with numerous controllers, without necessarily being limited to one type of communication. For example, one or more aspects of the invention can be used with controllers via various networks at different communication speeds.

In addition, one aspect of the invention provides for efficient communication of the updates, even in large scale operations, thereby minimizing the time of updates.

Accordingly, one or more embodiments of the present invention provide a method, system, and computer program device for receiving a remote download of microprocessor program code into an operating controller. There is provided a non-volatile random access memory, configured to store program code; a microprocessor, in communication with the non-volatile random access memory, including program random access memory executing a first program code; and a physical communication port in communication with the microprocessor. The microprocessor is configured to facilitate receiving second program code, via the communication port, and storing the second program code into the non-volatile random access memory; receiving a message, via the communication port, to initiate the second program code and causing a re-start of the microprocessor; and, responsive to the re-start, fetching the second program code stored in the non-volatile random access memory into the program random access memory to replace the first program code, and beginning execution of the second program code in the program random access memory.

According to one or more embodiments of the present invention, the microprocessor is further configured to facilitate transmitting, responsive to a query, an acknowledgement via the communication port that the program code was received.

According to one or more embodiments of the present invention, the second program code is received in connection with a globally addressed communication.

According to one or more embodiments of the present invention, the microprocessor is further configured to facilitate saving register information and operating data from the microprocessor into the non-volatile random access memory, and to restore the register information and operating data to the microprocessor from the non-volatile random access memory after re-start.

One or more embodiments of the present invention provide for including one or more irrigation control output.

According to one or more embodiments of the present invention, the microprocessor is further configured to facilitate communication, via the communication port, over a network. According to one or more embodiments of the present invention, the microprocessor is further configured to communicate, via the communication port, to a connection to a computer, and/or a connection to at least one other controller.

According to one or more embodiments of the present invention, the microprocessor is further configured to facilitate auditing whether the microprocessor successfully received the second program code.

One or more embodiments of the present invention provides for a method, system and computer-readable medium, including instructions being executed by a computer, for a computer-implemented method for downloading microprocessor code into one or more controllers, where the controllers include a microprocessor running an application that supports the download process. Accordingly, one or more embodiments of the present invention includes determining whether one or more controller is to receive an updated program code; transmitting the updated program code to the controller(s); and transmitting an instruction causing the controller(s) to initiate the new program code. The updated program code includes instructions for receiving program code and storing program code into random access memory of a controller.

One or more embodiments of the present invention provides instructions for implementing receiving a response from the controller(s) acknowledging receipt of the program code.

According to one or more embodiments of the present invention, the transmitting is global to controllers including the afore-mentioned controller(s).

One or more embodiments of the present invention also includes determining a respective communication speed of the controllers, and performing at least the transmitting step and receiving step for respective controllers having a same communication speed.

One or more embodiments of the present invention further includes auditing the at least one controller for missing portions of the program code, and transmitting mission portions of the program code to respective ones of the controllers.

According to one or more embodiments of the present invention, the computer executing the instructions is a controller.

One or more embodiments of the present invention provides a system, method and computer program device facilitating remote download of microprocessor code into a network of controllers. Accordingly, the one or more embodiments provides for multiple controllers, the controllers having (i) non-volatile random access memory, configured to store program code; (ii) a microprocessor, in communication with the non-volatile random access memory, including program random access memory executing a first program code; and (iii) a physical communication port in communication with the microprocessor. The microprocessor is configured to facilitate receiving second program code, via the communication port, and storing the second program code into the non-volatile random access memory; receiving a message, via the communication port, to initiate the second program code and causing a re-start of the microprocessor; and, responsive to the re-start, fetching the second program code stored in the non-volatile random access memory into the program random access memory to replace the first program code, and beginning execution of the second program code in the program random access memory. The microprocessor is further configured to communicate, via the communication port, to a connection to a computer and/or a connection to one or more other controllers. Also included is a computer program device, in communication with the controllers, configured to facilitate: (i) determining whether at least one of the controllers is to receive the second program code; (ii) transmitting the second program code to the controller(s); and (iii) transmitting the message causing the controller(s) to initiate the second program code.

According to one or more embodiments of the present invention, the second program code is transmitted globally to the controller(s).

According to one or more embodiments of the present invention, one or more of the controllers includes an irrigation control output.

According to one or more embodiments of the present invention, the computer program device is one of the controllers.

According to one or more embodiments of the present invention, the controllers are in communication on a peer-to-peer network.

According to one or more embodiments of the present invention, the computer program device is further configured to facilitate receiving a response from the controller(s) acknowledge receipt of the second program code.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which.

Figure 3:
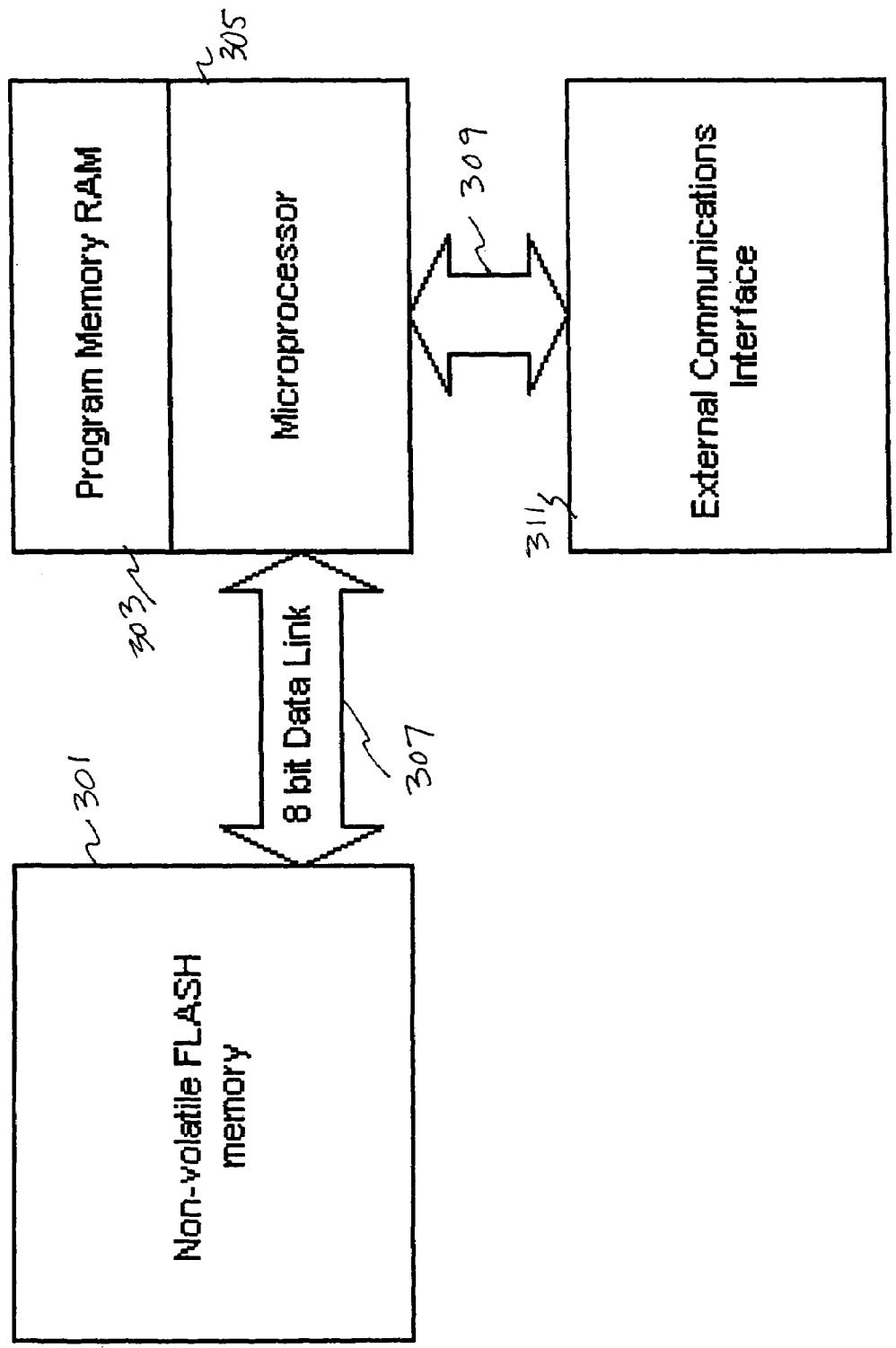
FIG. 3 is a functional block diagram illustrating memory and communication components of a controller.
Figure 4A:
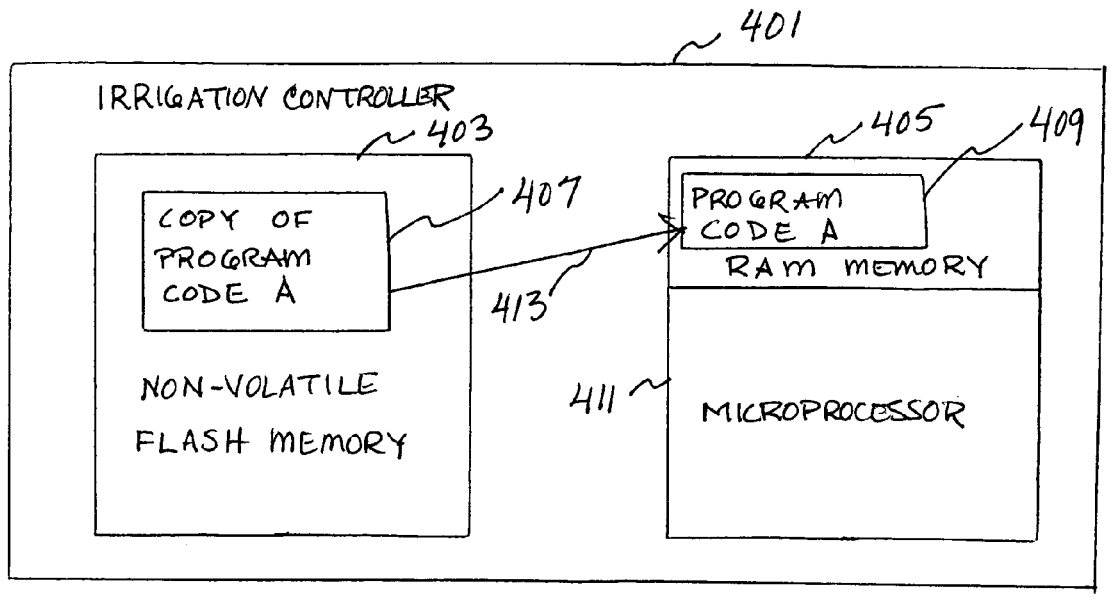
Figure 4B:
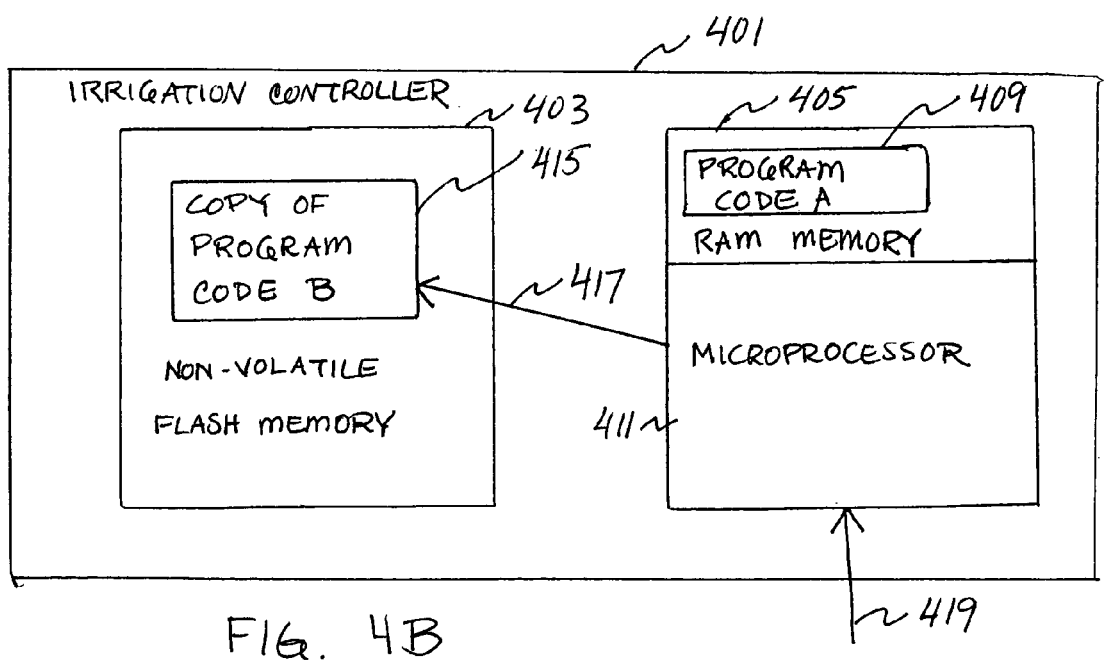
Figure 4C:
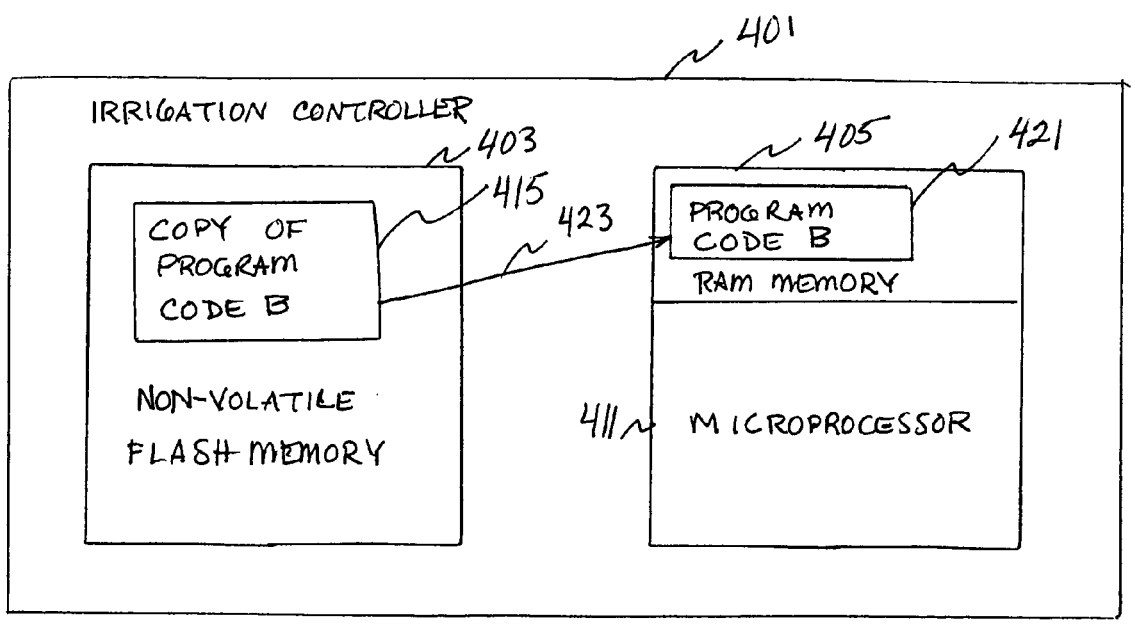

FIGS. 4A-C are functional block diagrams illustrating a remote update of program code in connection with the controller components of FIG. 3, according to one or more embodiments of the present invention.

Figure 5:
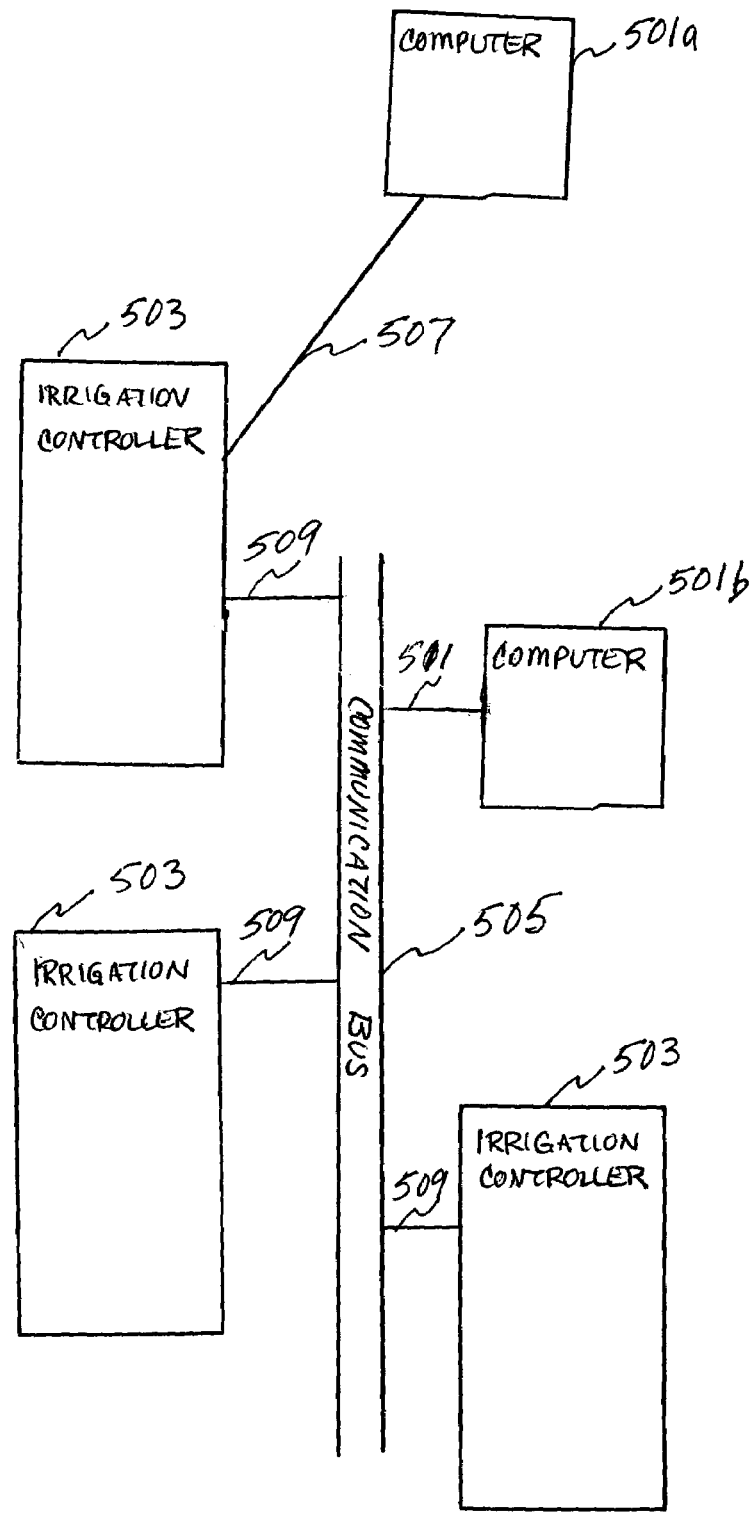

FIG. 5 is a block diagram illustrating a simplified example network of irrigation controllers, for use in operation of one or more embodiments of the present invention.

Figure 6:
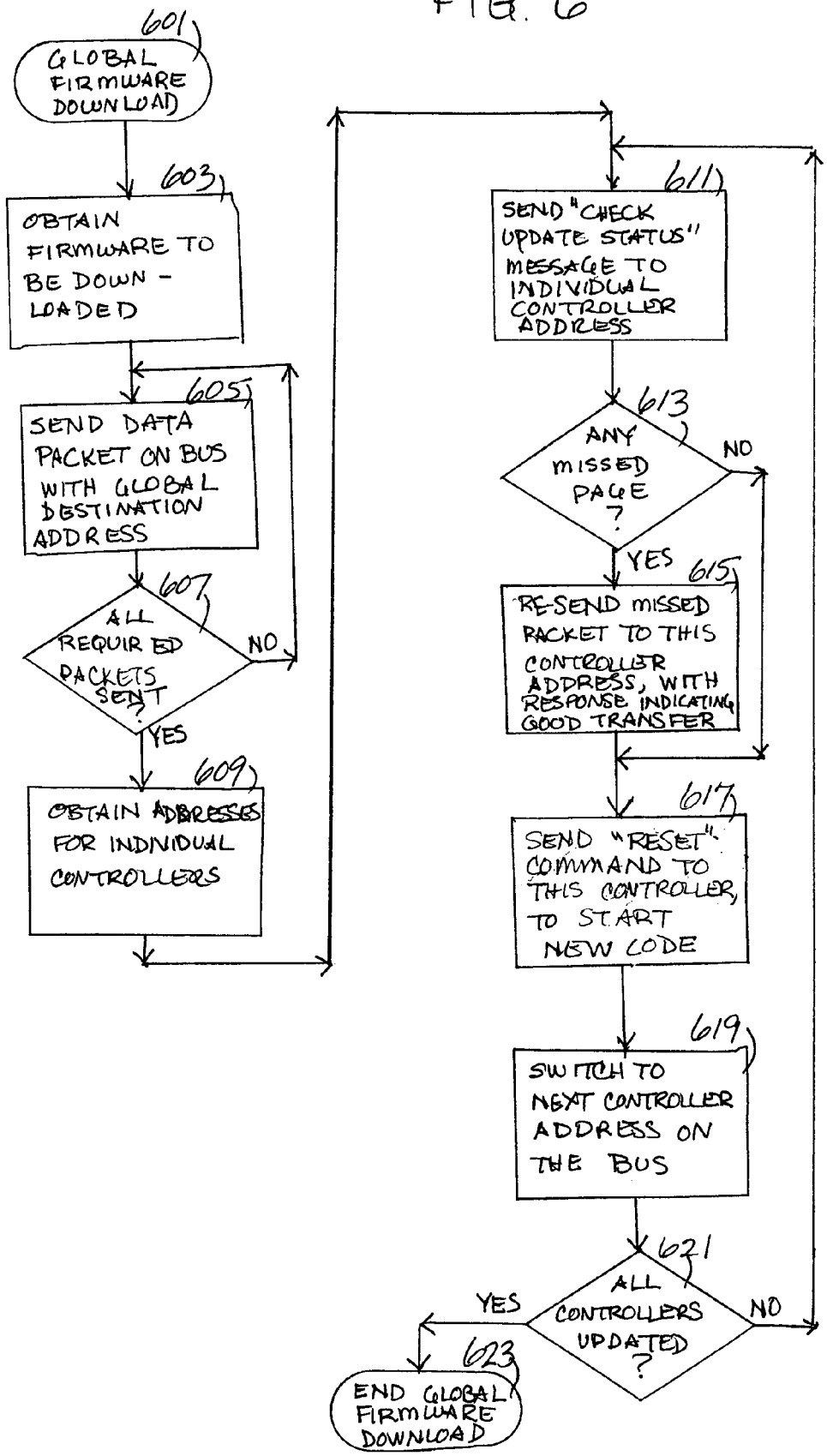

FIG. 6 is a flow chart illustrating an example process for providing a global remote program code download, according to one or more embodiments of the present invention.

FIG. 7 is a flow chart illustrating an example process, executing in a controller, for receiving a global remote program code download, according to one or more embodiments of the present invention.

FIG. 8 is a flow chart illustrating an example process, executing in a controller, of providing a confirmation of remote download and starting to execute the new code, according to one or more embodiments of the present invention.

Figure 9:
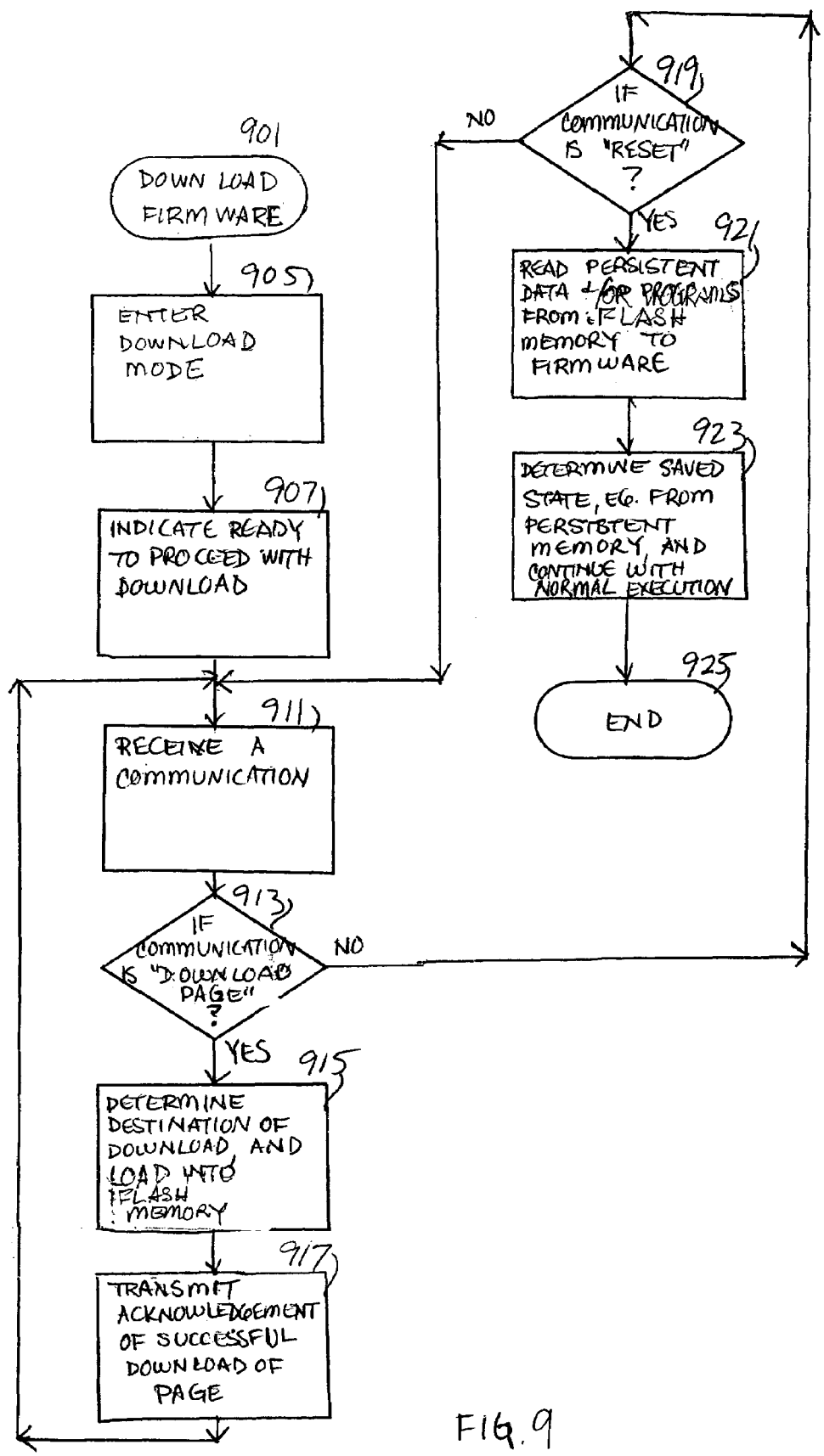

FIG. 9 is a flow chart illustrating an alternative embodiment for receiving, in a controller, a remote download of firmware.

Figure 10:
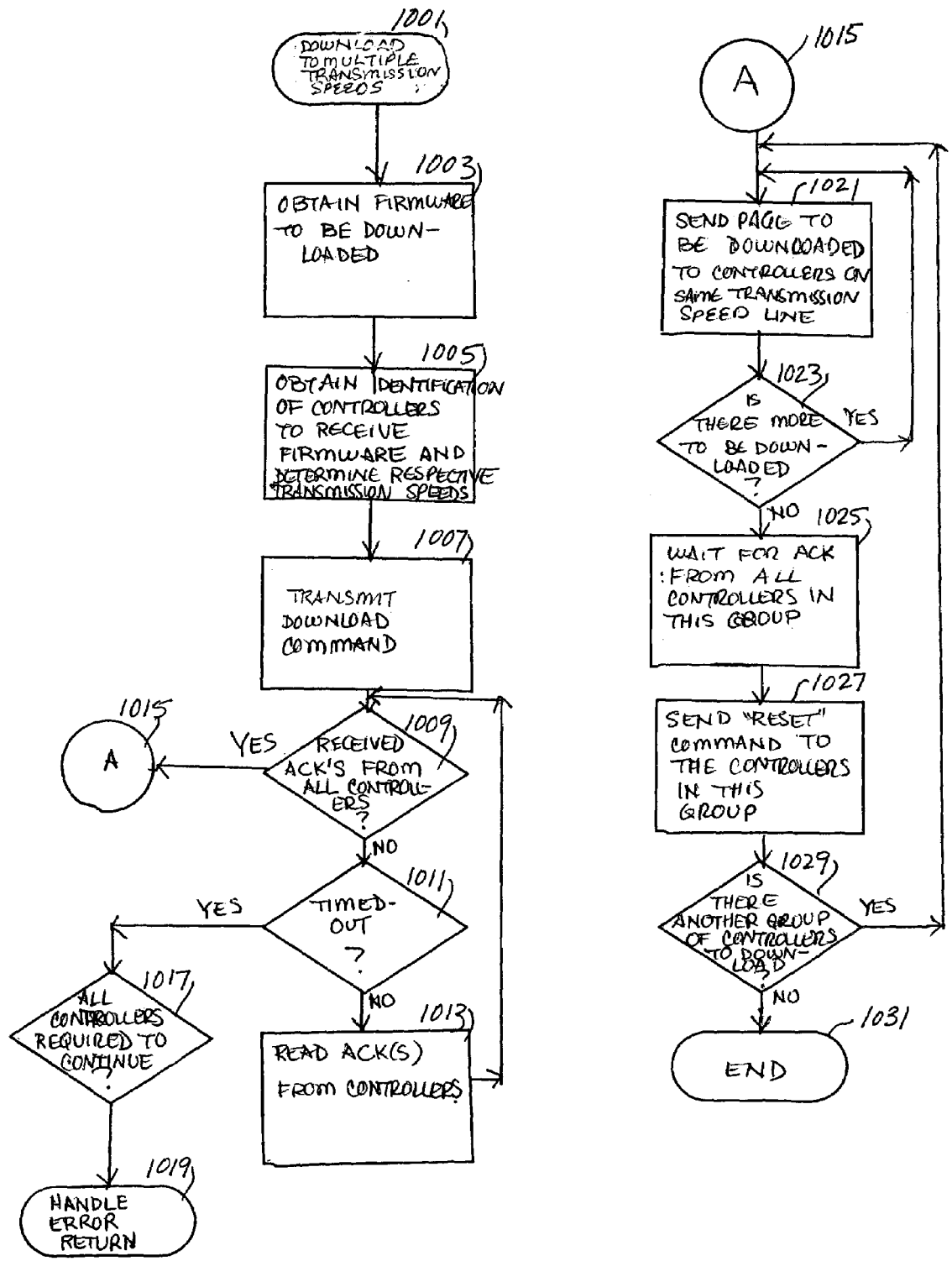

FIG. 10 is a flow chart illustrating an alternative embodiment for providing a global remote download of program code.

Figure 11:
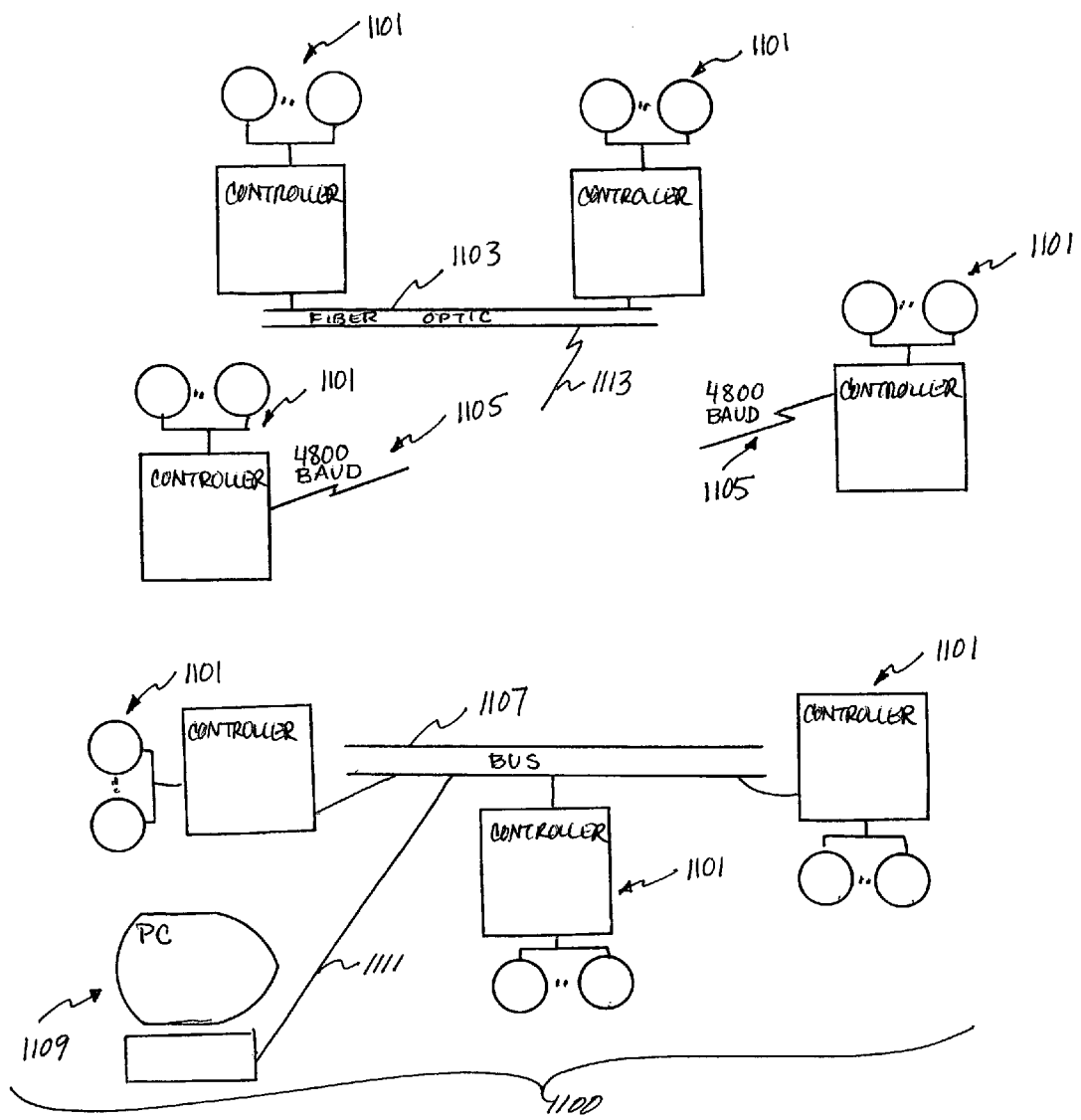

FIG. 11 is a block diagram illustrating controllers communicating via various communication paths with each other and with an optional computer, useful in operating one or more embodiments of the present invention.

Figure 12:
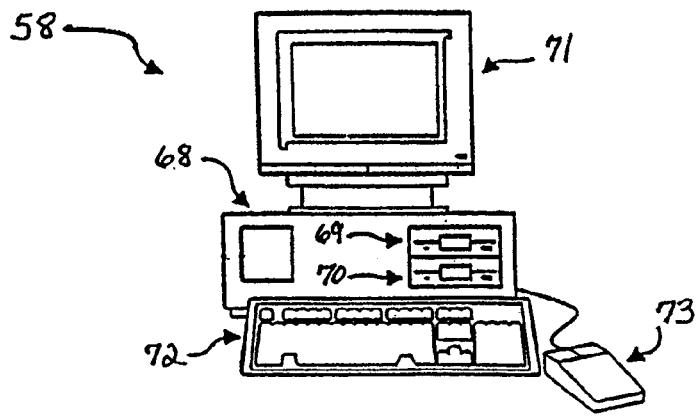

FIG. 12 shows a block diagram of a computer, suitable for use in connection with carrying out one or more embodiments of the present invention.

Figure 13:
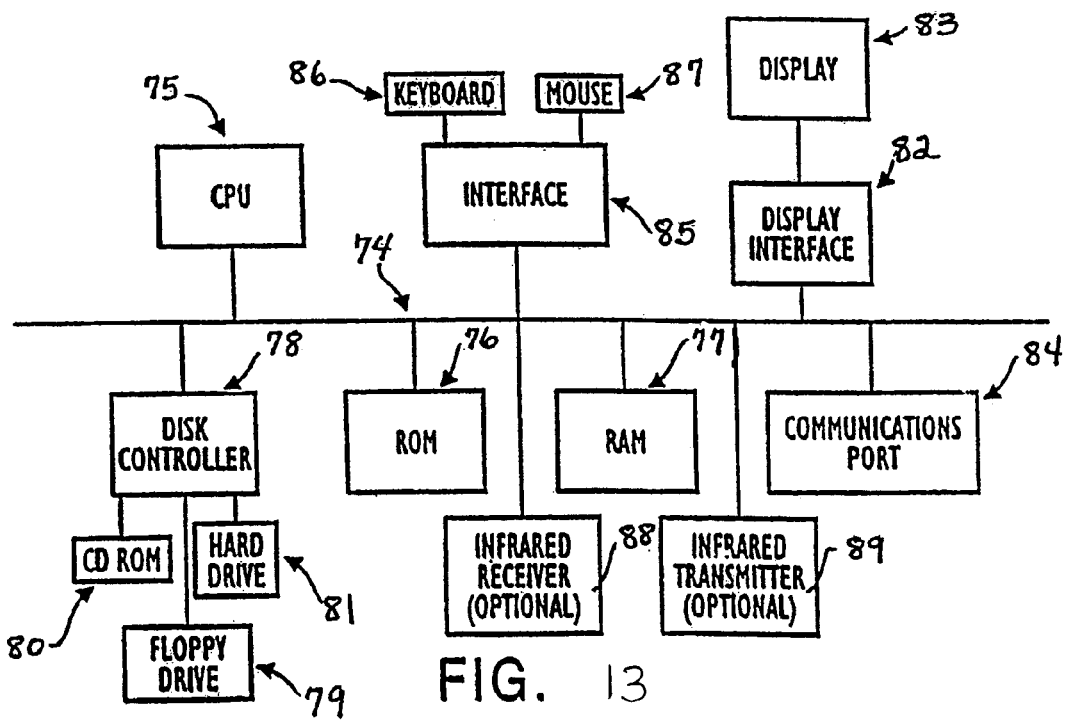

FIG. 13 illustrates a block diagram of the internal hardware of the computer of FIG. 12.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

Figure 1:
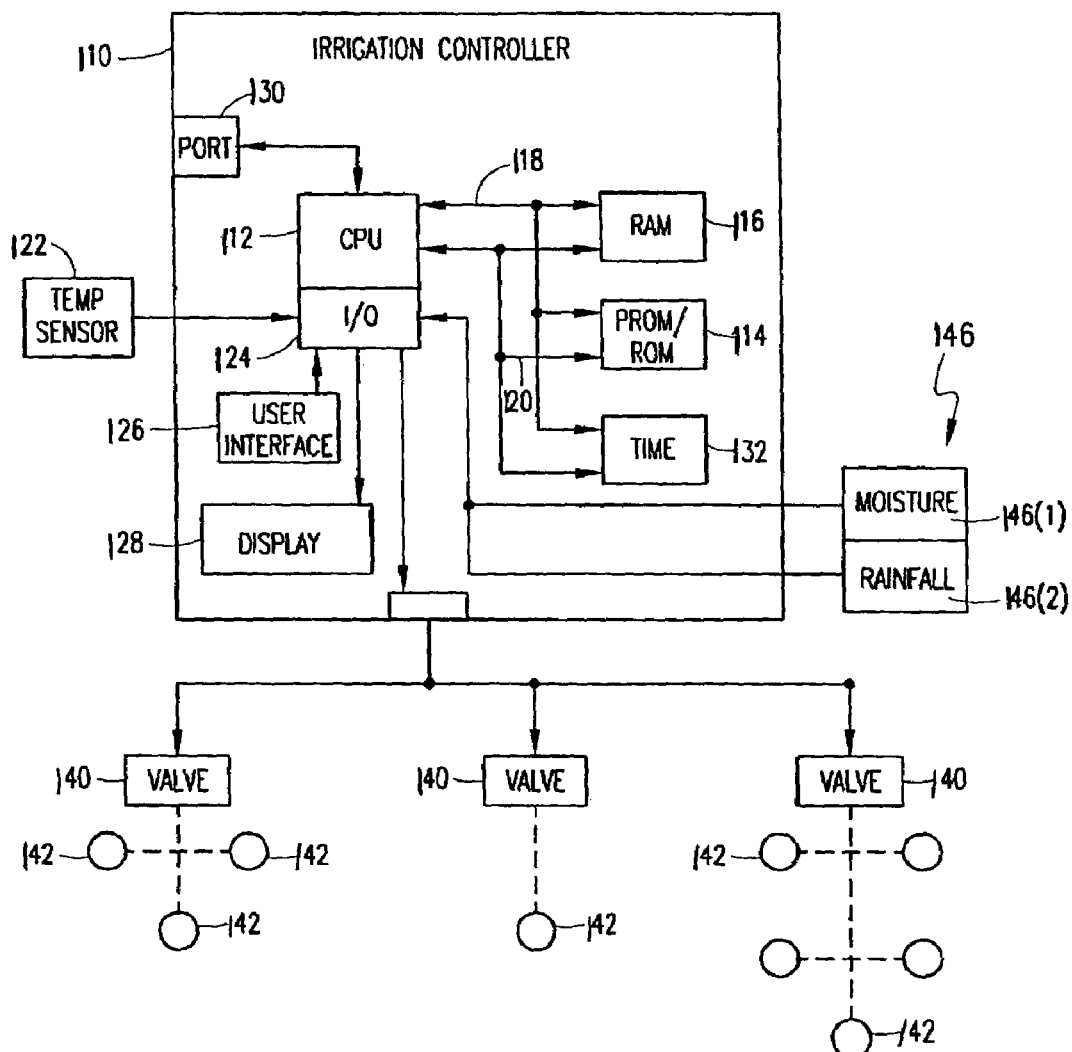
FIG. 1 is a block diagram of an example of a prior art irrigation controller.
Figure 2:
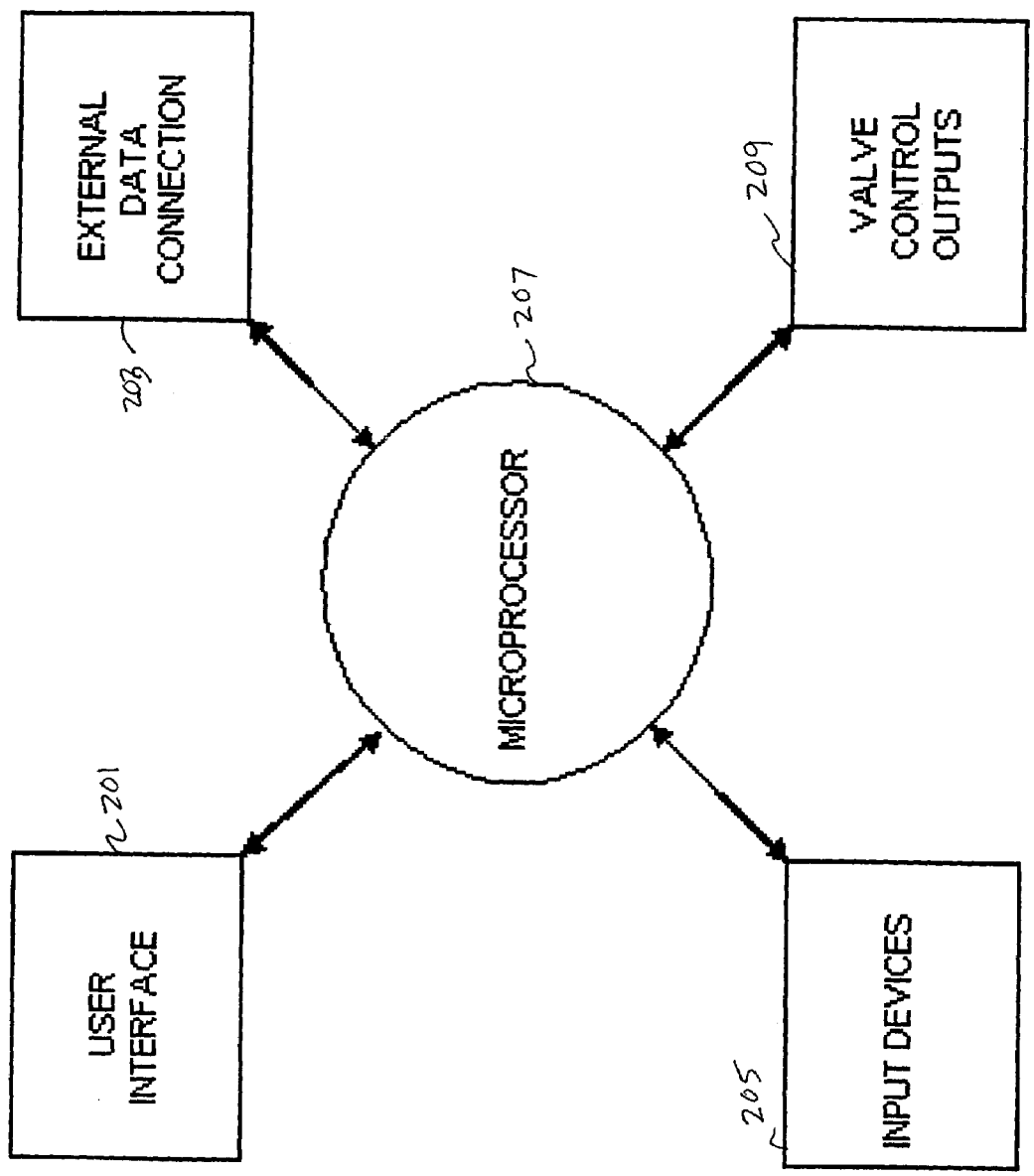
FIG. 2 is a functional block diagram illustrating components of an irrigation controller, for use in connection with one or more embodiments of the present invention.

The foundation of modern irrigation controller circuit design is the microprocessor/microcontroller. Referring to FIG. 2, a microprocessor 207 connects to various types of input/output interfaces, such as a user interface 201, an external data connection 203, one or more input devices 205, and one or more valve control outputs 209. The microcontroller may also include additional peripheral interfaces that are often part of the integrated circuit (IC) itself (although they may be external as well). This includes memory, timers, analog to digital converters, etc.

The microprocessor may be provided as part of a microcontroller. Microcontrollers perform their desired tasks as a result of their program code. A programmer writes code (often in a different language than the microcontroller requires, but which can be translated to the machine instructions) that enables the microcontroller to communicate with the various I/O devices and to perform its assigned tasks.

The program code resides in memory, either internal or external to the microcontroller integrated circuit itself. The program code is comprised of instructions that are combined to customize the operation of the microcontroller to fit an application. The instructions are addressed and fetched from memory, decoded and acted upon by the microcontroller. A microcontroller is a functional element of many different products, e.g., a digital camera, a printer, a cellular phone, an irrigation controller.

The program memory media in a microcontroller can take a variety of forms. For example, it can be embedded in the microcontroller integrated circuit itself or reside in a separate ROM or NVRAM chip; or perhaps on a removable card, disk, or tape. Additionally, the characteristics of the media can vary. In addition to its access speed, the memory may be fixed (non-changeable) or rewriteable. The advantage of a rewriteable memory source is the program code can be updated without physically changing the media. This simplifies code changes that may be required, for example, to initiate error fixes and to add features.

It can be anticipated that this basic architecture can vary. Some controller designs may be comprised of two or more microcontrollers sharing tasks, or some designs may even omit the microprocessor, or traditional functions of the microprocessor, in favor of, for example, a simple mechanical timer. Additionally, the types of interfaces will vary depending on the application.

One or more embodiments of the present invention provide a irrigation controller hardware/software design that allows program code updates via a non-dedicated communication channel. The communication channel used for the updates is the same interface is used for communication with other controllers when in a networked control environment. One example of a control network for irrigation management is illustrated in the present inventors' U.S. Pat. No. 6,600,971, Smith et al. (expressly incorporated herein by reference).

The controllers can be updated in different ways. By way of example, three methods are described below:

(1) Direct connection to computing device. A device with the new program code can be plugged into a communication channel on the controller directly, and initiate the transfer of the new code from the device to the controller.

(2) Remote connection to computing device. A device with the new program code may be connected to a communication bus that is shared among multiple controllers. The code transfer may be directed from the device to a particular controller or as a broadcast to all controllers on the bus.

(3) Connection to Controller with updated code. An irrigation Controller with the updated code resident may be used to transfer its code to one or more other controllers to which it is linked via a communication channel.

Other types of connections can be used, as will be appreciated by one of skill in the art.

The code to be updated is sent in blocks (or packets) via a pre-defined communication protocol that is understood by both the device with the new program code and the controller(s). According to one or more embodiments of the present invention, the communication protocol provides a definition of the data packet structure. The packet structure can include, for example, the address of the source and/or destination device, control characters indicating the type of message, and framing characters defining the start and end of the packet. One or more aspects of the present invention permit sending the code in blocks, which allows the code to be sent as multiple messages, thereby preventing the communication channel from being monopolized by the update process.

Optionally, each block of data can include integrity data (such as a check-sum or cyclical redundancy check (CRC)) to verify that the data was not corrupted by the communication process, and/or that the data or packets were not missing.

For updates addressed to a particular destination controller, one or more embodiments of the present invention provide that the destination controller sends an acknowledgement response to each data packet transfer, instructing the source that the message was received and stored in good condition. For broadcast updates, the source can broadcast all data packets. Upon completion, it can address the individual controllers to determine which, if any, data packets were missed that need to be resent.

The hardware architecture for the microprocessor subsystem is shown in FIG. 3. The microprocessor integrated circuit 305 contains RAM 303 (volatile memory source) that is used to store the program memory code which is executing to run the controller. Because the contents of RAM are not preserved without power applied, the program code is stored off chip in a non-volatile FLASH memory integrated circuit (IC) 301. Upon power-up or circuit reset, the microprocessor 305 transfers the data, e.g., via an 8 bit data link 307, from FLASH memory 301 to the program memory RAM 303. After all data is transferred, code execution begins from the RAM memory cell. The microprocessor 305 also sends and receives data 309 via an external communications interface 311.

With the illustrated architecture, incoming message packets containing the new program code can be received and the program code can be written directly to the FLASH memory. Reference is now made to FIGS. 4A-4C. FIGS. 4A-C generally illustrate an irrigation controller 401, with the microprocessor subsystem of FIG. 3. The microprocessor 411 contains RAM memory 405, storing the program code that is executed by the microprocessor. Also provided is a non-volatile FLASH memory 403, for storing program code.

The instructions facilitating the transfer of downloaded program code received over the communication link are resident and executing in the program memory RAM 405 in the microprocessor 411. When the microprocessor starts, as illustrated in FIG. 4A, the copy of the original program code, here referred to as "program code A" 407, is automatically transferred from the FLASH memory 403 via communication link 413 into the RAM memory 405. At the end of the process, the RAM memory 405 contains a complete copy of the program code A 409, and begins executing the program code A. The program code A performs the usual processes concerning the controller.

The microprocessor is configured to receive and optionally transmit communications over a communications link 419. When one of those communications indicates that a program is to be downloaded, the microprocessor proceeds to receive the new program code, referred to as "program code B" 415. The microprocessor stores, via the communication link 417, the program code B 415 into the non-volatile FLASH memory 403.

When the new program load is complete, the microprocessor 411 can be caused to begin utilizing program code B. For example, the microprocessor reset itself in response to a reset message, causing essentially the same steps described in FIG. 4A to be performed. However, because the FLASH memory 403 has program code B 415, the reset or re-start process causes the microprocessor 411 to load the RAM 405 with program code B 421 via the communications link 423. When the microprocessor begins executing, it will be executing program code B, rather than program code A.

For controllers linked to other intelligent systems via some form of communication channel, a method to further simplify code upgrades would be to transmit the code to the requisite controllers. Depending on the structure of the communications, remote updates can be achieved without ever having to present at the controller.

FIG. 5 illustrates a simplified example network of irrigation controllers. As illustrated, an irrigation controller system may include several irrigation controllers 503, transmitting and receiving data 509 to each other via a communication bus 505. According to one or more embodiments of the present invention, the irrigation controllers are in a peer-to-peer network. Optionally, a computer 501*a* may communicate 507 with one or more of the irrigation controllers 503; or a computer 501*b* may communicate 511 directly with the irrigation controllers 503 via the communication bus 505. Remote updates can be provided from various sources, such as directly from the computer 501*b* communicating via the communication bus 505, from the computer 501a communicating to the other irrigation controllers via the irrigation controller 503 to which it is connected, and/or from an irrigation controller 503. This enables a user to easily provide remote updates from any convenient location, including a field location, whether or not a computer is provided. In operation, the network of controllers may include more or fewer controllers, and may omit the computers.

Reference is now made to FIG. 6, providing an example flow chart of a process for providing a global remote program code download. The program code download can be initiated automatically, for example, in response to a receipt of updated program code at a central computer for a network, upon receipt of an e-mail with an updated program by a controller in a peer-to-peer network, and/or manually, e.g., in response to a user command. The process for providing the remote program code download operates on, for example, one of the controllers, a hand-held device or computer connected to a controller, or a computer connected to the network of controllers. One or more embodiments of a global remote program code download 601 include obtaining the firmware (or program code) to be down-loaded, block 603. The program code could be, for example, entirely new code, a corrected version of the current system, etc. According to one or more aspects of the present invention, the program code includes instructions for the ability to receive and store updated program code into the FLASH memory.

The program code can be obtained from any appropriate source. For example, the program code may be forwarded by the manufacturer of the microcontroller to a central computer for each of multiple networks for golf courses.

The device performing the global firmware download is connected to the communication bus or other communication link. The updated code preferably is to be sent in appropriately sized data packets over the bus, so as to avoid monopolizing the bus. Accordingly, the device sends the data packet on the bus, with e.g., a global destination address, block 605. The device checks whether all required packets were sent, block 607, and if not, repeats back to block 605 to send an additional data packet on the bus with a global destination address. The use of a global destination address has the advantage that all devices on the bus, even if hundreds of controllers, may receive each single communication.

Once the updated code has been sent, one or more embodiments of the present invention provide for error control and error checking, shown for example in blocks 609-623. As an alternative, one the updated code has been sent, a global reset command may be sent. Referring now to block 609, the device obtains the addresses for individual controllers, so as to be able to individually address the controllers.

The device loops through blocks 611-619 for individual controllers, which may include an audit of the controller for missing pages of the download. At block 611, the device sends a "check update status" message to individual controller addresses. At block 613, the device checks for a "missed page" message from one or more of the controllers, preferably specifying the missed page or page. If there is a missed page, then at block 15 the device re-sends the particular packet with the missed page to the particular controller. Further, according to one or more embodiments of the present invention, the device includes in the message a request that the controller return an acknowledgement, indicating successful completion by the controller of the page transfer. At block 617, the device sends a "reset" command to the controller, causing the individual controller to reset, as described herein. At block 619, the device switches to the next controller address on the bus. When all controllers are updated, block 621, the global firmware download is completed, block 623.

Reference is made to FIG. 7 illustrating an example process, executing in program memory RAM of a controller, for receiving a global remote program code download, block 701. At block 703, the controller receives a data packet, with a global destination address (e.g., intended for all controllers on the bus). At block 705, the controller checks whether this is a download program code packet. If so, the controller receives the data packet, block 707, and stores the data packet in the non-volatile FLASH memory, block 709. At block 711, the controller checks whether there is another data packet. If so, the controller loops to block 707. Otherwise, the controller is done downloading data packets.

Reference is now made to FIG. 8 is a flow chart illustrating an example process, executing in program memory RAM of a controller, of providing a confirmation of remote download status and starting to execute the new code, block 801. At block 803, the controller receives a data packet with this controllers address. At block 805, the controller checks whether this is a "check update status message". If so, then at block 807, the controller checks whether it received all of the packets. This could be implemented, for example, by numbering of pages or other conventional ways. If the controller did not receive all packets, then at block 809, the controller transmits the identity of the missed packets, e.g., particular page numbers. At block 811, the controller awaits and receives re-sent data packets, and at block 813, the controller stores the re-sent data packets in the appropriate locations of the non-volatile FLASH memory. The controller sends a response indicating a good transfer, at block 815, and the download status processing ends at block 817.

FIG. 9 is a flow chart illustrating an alternative embodiment for receiving, in a controller, a remote download of firmware, block 901. Upon receiving the download command, the controller optionally enters the download mode, block 905. In the download mode, no input/output control is performed, while resources are dedicated to the download.

At block 907, the controller indicates that it is ready to proceed with the download. The controller receives a communication at block 911, which may be addressed globally or to the particular controller. If the communication is "download page", block 913, the controller proceeds to determine the destination of the download, such as a particular page, and loads the contents of the download into a particular location in the non-volatile FLASH memory, block 915. At block 917, the controller transmits an acknowledgement of the successful download of the page, and loops back to block 911 to receive additional communications. In this manner, one or more pages of a particular download can be loaded, e.g., for a minor firmware patch, or even the entire operating program code.

At block 919, the controller checks to ascertain whether the communication is a "reset" command. If not, the controller loops back to block 911 to receive further communications. If it is a "reset" command, at block 921 the controller reads the updated program code from the non-volatile FLASH memory to the program memory RAM and, optionally, reads the stored persistent data and/or programs (e.g., irrigation schedules and data) from the FLASH memory to other microprocessor memory. At block 923, the controller optionally updates the states of the new code now executing, with various saved states; and begins executing the new code, now in program memory RAM. At block 925, the firmware download process is ended (and new code is being executed).

FIG. 10 is a flow chart illustrating an alternative embodiment for providing a remote download of program code, block 1001, executing on a device for providing the download, to controllers having different communication transmission speeds. At block 1003, the device obtains the firmware to be downloaded. At block 1005, the device obtains the identification of the controllers intended to receive the firmware download and determines the respective transmission speeds of the controllers. At block 1007, the device transmits a download command to all controllers. Then, at block 1009, the device loops until it receives acknowledgements from all controllers, or otherwise times out. If the response does not time out, block 1011, the device reads acknowledgements from other controllers, block 1013. If the response does not time out, the device optionally checks whether it must have all controllers in order to continue, block 1017, e.g., where it is mandatory for all controllers to have the identical code. At block 1019, the device performs appropriate error handling since all required controllers are not present.

Otherwise, if all controllers have acknowledged the global download command, block 1015, the device sends global downloads to groups of controllers having the same transmission speed. At block 1021, the device sends a global download page to controllers on the same transmission speed line. At block 1023, the device checks whether there is more to be downloaded, and if so, loops back to block 1021. Otherwise, the device waits for an acknowledgement from all controllers in the particular group, block 1025, to indicate a successful download. At block 1027, the device sends a "reset" command to the controllers in this particular group, causing this group of controllers to load and begin executing the new code. At block 1029, the device determines whether there is another group of controllers remaining to be downloaded. If so, the device loops back to block 1021 and begins a global send of pages to be downloaded to the next group of controllers on the same transmission speed line. Otherwise, if there are no more groups of controllers to be downloaded, the system ends processing for the global download, block 1031.

FIG. 11 provides an example block diagram to suggest but not limit, by example, the range of types of communication paths that may be used in operation with one or more embodiments of the present invention, and varying configurations of connections that may be encountered in the field and used in connection with one or more embodiments of the present invention. An irrigation network may be set up, for example, in a peer-to-peer architecture, a central-satellite architecture, or other network architectures. An irrigation network 1100 may include various controllers 1101, which may be of different types. Some of the communication controllers 1101 may be connected to each other via a fiber optic network 1103, generally providing high speed communications. However, not all irrigation networks include fiber optic components. For example, one or more controllers 1101 may be connected via a slow speed connection, such as a 4800 baud dial up modem. More typically, controllers 1101 are connected to each other via a standard communications bus 1107. The fiber optic network may be connected to via communication line 1113, the slow speed dial-up controllers may be connected to by dialing up, and/or the communication bus may be connected to directly, e.g., by computer 1109.

It may be desirable to download new program code to controllers which are connected via any or all of these types of communication. The remote update can be performed, optionally throughout the entire irrigation system, from a device such as a computer (e.g., 1109) or computer alternative, a computer controlling a controller (not illustrated), and/or one of the controllers 1101. Naturally, other combinations of these components, provided merely by way of example, may be used in operation of the present invention.

The designation "flash memory" has been used in the foregoing exemplary embodiments. One or more embodiments may be implemented with other types of non-volatile random access memory (NVRAM), including without limitation battery backed RAM, disk, EEPROM, dynamic RAM, static RAM, etc.

A central computer for a network optionally tracks a version of operating systems installed on particular controllers. The controller itself may track the version of its own program code. Optionally, the download of updated code can be limited to controllers or groups of controllers that lack the updated version. Optionally, a controller can ignore the code for a version that it already has received.

One or more alternative embodiments of the present invention may be used in connection with a computer communicating via the network, although use of the computer is not necessary for other embodiments of the present invention. FIG. 12 is an illustration of a computer 58 used for implementing the computer processing in accordance an optional embodiment of the present invention.

Viewed externally in FIG. 12, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

FIG. 13 illustrates a step diagram of the internal hardware of the computer of FIG. 12. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

The processing described herein could be controlled by a software program, or could even be partially or wholly implemented in hardware. The system used in connection with the invention may rely on the integration of various components including, as appropriate and/or if desired.

Although the computer in FIG. 12 is illustrated as a personal computer, the computer may be replaced by, or combined with, any suitable processing system operative in accordance with the principles of embodiments of the present invention, including sophisticated calculators, hand held, personal digital assistant, remote control device, laptop/notebook, mini computers, as well as processing system network combinations of the same. Further, portions of the system may be provided in any appropriate electronic format, including, for example, provided over a communication line as electronic signals, provided on floppy disk, provided on CD ROM, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used.

A communications link to one or more controllers may be a dedicated link, a modem over a POTS line, and/or any other method of communicating between controllers and/or users.

One or more embodiments of the present invention have been illustrated in simplified format. The illustrations are intended as example, and will be understood to include equivalents. For example, the computer may be omitted from the network. Further, it is not intended to limit the present invention to the particular number of controllers illustrated, in the particular communication systems illustrated. One or more embodiments of the present invention may operate in connection with various other combinations of the same.

The invention may include a process and/or steps. Where steps are indicated, they may be performed in any order, unless expressly and necessarily limited to a particular order. Steps that are not so limited may be performed in any order.

What is claimed is:

1. A device for receiving a remote download of microprocessor program code into an operating controller, comprising:
    (A) non-volatile random access memory, configured to store program code;
    (B) a microprocessor, in communication with the non-volatile random access memory, including program memory random access memory executing a first program code; and
    (C) a physical communication port in communication with the microprocessor;
    (D) wherein the microprocessor is configured to facilitate first receiving second program code, via the communication port, and storing the second program code into the non-volatile random access memory; after the first receiving, second receiving a message, via the communication port, to initiate the second program code and causing a re-start of the microprocessor; and, responsive to the re-start, fetching the second program code stored in the non-volatile random access memory into the program memory random access memory to replace the first program code, and beginning execution of the second program code in the program memory random access memory.

2. The device of claim 1, wherein the microprocessor is further configured to facilitate transmitting, responsive to a query, an acknowledgement via the communication port tat the second program code was received.

3. The device of claim 1, wherein the second program code is received in connection with a globally addressed communication.

4. The device of claim 1, wherein the microprocessor is further configured to facilitate saving register information and operating data from the microprocessor into the non-volatile random access memory, and to restore the register information and operating data to the microprocessor from the non-volatile random access memory after re-start.

5. The device of claim 1, further comprising at least one irrigation control output.

6. The device of claim 1, wherein the microprocessor is farther configured to facilitate communication, via the communication port, over a network.

7. The device of claim 1, wherein the microprocessor is further configured to communicate, via the communication port, to at least one of a connection to a computer, and a connection to at least one other controller.

8. The device of claim 1, wherein the microprocessor is further configured to facilitate auditing whether the microprocessor successfully received the second program code.

9. A computer-readable medium comprising instructions being executed by a computer, the instructions including a computer-implemented method for downloading microprocessor code into one or more controllers, where the controllers include a microprocessor running an application that supports the download process, the instructions for implementing the steps of:
    (A) determining whether at least one controller is to receive an updated program code;
    (B) first transmitting the updated program cock to the at least one controller;
    (C) second transmitting an instruction causing the at least one controller to initiate the updated program code; and
    (D) determining a respective communication speed for each of a plurality of controllers including the at least one controller,
    wherein at least the first transmitting step and receiving step are performed for respective controllers having a same communication speed,
    wherein the updated program code includes instructions for receiving program code and storing program code into non-volatile random access memory of a controller.

10. The medium of claim 9, further comprising instructions for implementing the step of receiving a response from the at least one controller acknowledging receipt of the updated program code.

11. The medium of claim 9, wherein the updated program code of the first transmitting is globally addressed to a plurality of controllers including the at least one controller.

12. The medium of claim 9, further comprising auditing the at least one controller for missing portions of the updated program code, and transmitting missing portions of the updated program code to respective ones of the controllers.

13. The medium of claim 9, wherein the computer executing the instructions is a controller.

14. A system facilitating remote download of microprocessor code into a network of controllers, comprising:

(A) a plurality of controllers, the controllers having (i) non-volatile random access memory, configured to store program code; (ii) a microprocessor, in communication with the non-volatile random access memory, including program random access memory executing a first program code; and (iii) a physical communication port in communication with the microprocessor; (iv) wherein the microprocessor is configured to facilitate receiving second program code, via the communication port, and storing the second program code into the non-volatile random access memory; receiving a message, via the communication port, to initiate the second program code and causing a re-start of the microprocessor; and, responsive to the re-start, fetching the second program code stored in the non-volatile random access memory into the program random access memory to replace the first program code, and beginning execution of the second program code in the program random access memory; wherein the microprocessor is further configured to communicate, via the communication port, to at least one of a connection to a computer and a connection to at least one other controller; and (B) a computer program device, in communication with the plurality of controllers, configured to facilitate: (i) determining whether at least one controller of the plurality of controllers is to receive the second program code; (ii) transmitting the second program code to the at least one controller; and (iii) transmitting the message causing the at least one controller to initiate the second program code.

15. The system of claim 14, wherein the second program code is transmitted globally to the plurality of controllers.

16. The system of claim 14, wherein at least one controller of the plurality of controllers includes an irrigation control output.

17. The system of claim 14, wherein the computer program device is one of the plurality of controllers.

18. The system of claim 14, wherein the plurality of controllers are in communication on a peer-to-peer network.

19. The system of claim 14, wherein the computer program device is further configured to facilitate receiving a response from the at least one controller acknowledge receipt of the second program code.

* * * * *